(12) United States Patent
Bon et al.

(10) Patent No.: US 7,069,102 B2
(45) Date of Patent: Jun. 27, 2006

(54) SYSTEM AND METHOD TO CUSTOMIZE BOND PROGRAMS COMPENSATING INTEGRATED CIRCUIT BONDER VARIABILITY

(75) Inventors: David J. Bon, Plano, TX (US); Sreenivasan K. Koduri, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 454 days.

(21) Appl. No.: 09/855,893

(22) Filed: May 15, 2001

(65) Prior Publication Data

US 2001/0044660 A1  Nov. 22, 2001

Related U.S. Application Data

(60) Provisional application No. 60/204,997, filed on May 16, 2000.

(51) Int. Cl.
*G06F 19/00* (2006.01)

(52) U.S. Cl. .......................................... 700/121; 700/3
(58) Field of Classification Search .................... 700/3, 700/121, 96, 182
See application file for complete search history.

(56) References Cited

U.S. PATENT DOCUMENTS

| | | | | |
|---|---|---|---|---|
| 5,516,023 A | * | 5/1996 | Kono | ........................ 228/4.5 |
| 5,579,984 A | * | 12/1996 | Sasano | ........................ 228/102 |
| 5,615,821 A | * | 4/1997 | Sasano | ........................ 228/102 |
| 5,862,974 A | * | 1/1999 | Sasano | ........................ 228/4.5 |
| 5,963,451 A | * | 10/1999 | Seki et al. | .................. 700/182 |
| 6,198,981 B1 | * | 3/2001 | Nakamura et al. | .......... 700/121 |
| 6,429,187 B1 | * | 8/2002 | Sontheimer et al. | ........... 514/2 |
| 6,467,673 B1 | * | 10/2002 | Enokido et al. | ............ 228/105 |
| 6,597,963 B1 | * | 7/2003 | Koduri et al. | .............. 700/121 |
| 6,629,013 B1 | * | 9/2003 | Koduri et al. | .............. 700/121 |
| 2001/0044669 A1 | * | 11/2001 | Koduri et al. | .............. 700/121 |

\* cited by examiner

*Primary Examiner*—John Follansbee
*Assistant Examiner*—Jungwon Chang
(74) *Attorney, Agent, or Firm*—Yingsheng Tung; Wade James Brady, III; Frederick J. Telecky, Jr.

(57) ABSTRACT

A computerized system and method for customizing bond programs in order to compensate first for variabilities in an integrated circuit (IC) "slave" bonder, and second to any irregularities in a "slave" circuit positioned on the slave bonder for attaching connecting bonds onto the IC bond pads. According to the invention, a "master" segmentator groups the bond pads of a "master" circuit on a master bonder into segments and stores the reference data related to these segments in a master file. Next, a slave regenerator, coupled to the master file, regenerates the master reference data so that variable characteristics of the slave bonder are defined and adaptively compensated. Finally, a slave corrector, coupled to the salve regenerator, corrects the bond program for the slave circuit on the adaptively compensated slave bonder. The slave bonder attaches the connecting bonds based on the computed correct bond locations.

2 Claims, 7 Drawing Sheets

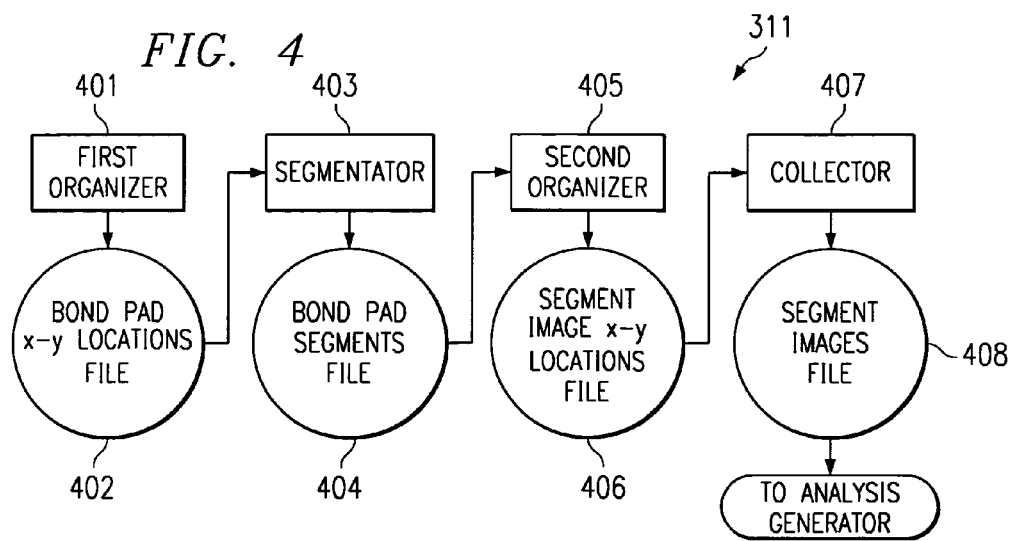
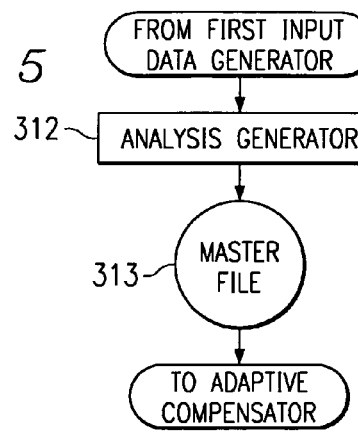
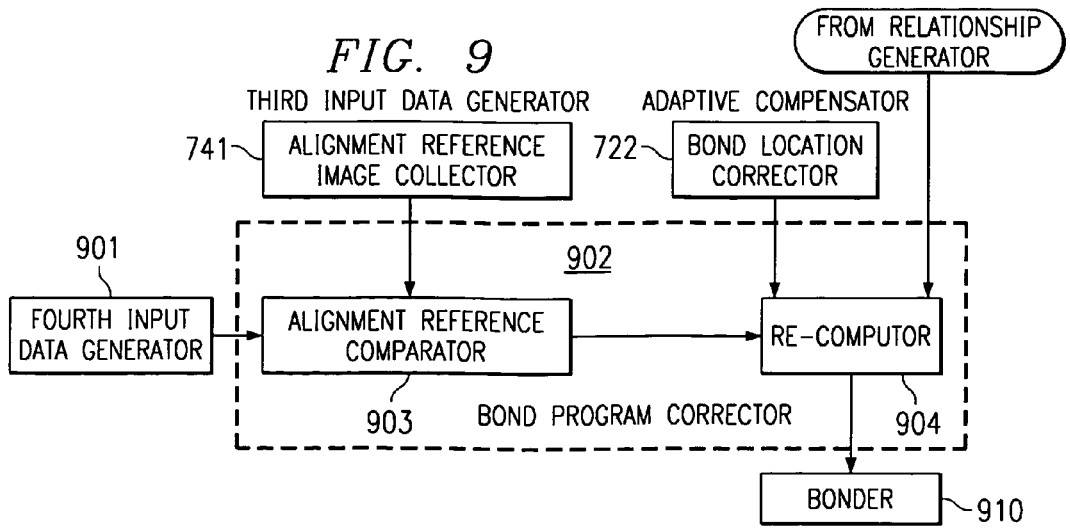

SYSTEM AND METHOD TO CUSTOMIZE BOND PROGRAMS COMPENSATING INTEGRATED CIRCUIT BONDER VARIABILITY

This application claims priority under 35 USC § 119 based upon Provisional Patent Application No. 60/204,997, filed May 16/2000.

FIELD OF THE INVENTION

The present invention is related in general to the field of semiconductor devices and electronic systems and more specifically to bond program customization and operation of computer-controlled bonding machines used in integrated circuit assembly.

DESCRIPTION OF THE RELATED ART

In integrated circuit (IC) assembly, an IC chip is typically mounted on a leadframe and electrically connected to it by metallic segments. Commonly, the chip assembly is encapsulated in a protective package (for instance, ceramic package, or plastic package using molding process). Typically, the IC chip has a plurality of bond pads, which are often positioned around the chip perimeter; these bond pads have predetermined bonding area and spacing (bond pad pitch). The leadframe usually has a plurality of narrow "inner" leads for attachment to the segments and inclusion in the package, and a plurality of wider "outer" leads for attachment to other parts such as solder attachment to circuit boards.

The metallic segments used for electrical connection of the IC chip to the leadframe include wires and ribbons, and are attached by ball bonding, stitch bonding, or wedge bonding techniques. Wire bonding is a process in which a wire may be welded from a chip bond pad to the tip of an inner lead of the leadframe. As an example, in wire ball bonding the ball is attached to the chip bond pad and the stitch to the leadframe inner lead. For a given device type, there is a set of locations expressed in x and y coordinates which defines the bond locations on the chip and on the lead tips. These locations are generally stored collectively in a computer file, sometimes referred to as "Device Program". Apart from the bond head, capable of providing x-y-z motion needed for bonding, a wire bonder has a material handling subsystem and the vision subsystem.

Conventional semiconductor computerized wire bonders use x-y tables to move the bonding capillary over the device for bonding between the chip and the leadframe. The x-y coordinate tables are driven by complex electrical and mechanical components that may convert rotary and linear motions of the axis drive motors to create the needed positioning. The bond head also carries several other components such as the z-axis drive motor, a camera and optics for vision functions, and further components required to control wire bonding. Specific features of the capillary and its alignment are described in a number of U.S. patents and patent applications. Examples are: U.S. Pat. No. 5,934,543, issued on Aug. 10, 1999 (Koduri et al., "Wire Bonding Capillary having Alignment Features"); and application Ser. No. 08/993,638, filed on Dec. 18, 1997, now U.S Pat. No. 6,112,972 (Koduri, "Wire Bonding with Capillary Realignment"). The interaction of capillary and vision system is illustrated, for example, by U.S. patent applications Ser. No. 09/191,812, filed on Nov. 13, 1998, now abandoned (Koduri et al., "Automation of Optics Offset Measurement on Wire Bonders"); Ser. No. 09/111,642, filed on Jul. 8, 1998, now U.S. Pat. No. 6,042,247 (Koduri et al., "An Efficient Hybrid Illuminator"); Ser. No. 09/111,977, filed on Jul. 8, 1998, now U.S. Pat. No. 6,292,580 (Koduri et al., "An Efficient Illumination System for Wire Bonders").

The material handling system moves a leadframe so that each device can eventually be placed under the bond head for bonding. One or more devices may be placed under the bond head at a time to be bonded. The device may also be heated in a predetermined manner to establish reliable metallurgical bonding conditions. After a device has been bonded, the leadframe is step-moved such that the next unit can be bonded.

When a unit is indexed in by the material handling system for bonding, the position of the leadframe and the chip is not always the same because of variations in the handling and previous manufacturing (such as variable chip positioning during attachment to the leadframe). Without knowing accurately the target bonding locations, the bond head cannot place the bonds as expected. To aid this process, a machine vision system is employed. A typical vision system consists of a set of optics to provide the needed illumination and magnification of the device, a camera to capture the image provided by the optics and an image processing system to store and analyze the captured image.

Before bonding a device, it is essential to determine the device program with all the coordinate locations of the bonds that need to be created. With respect to a predetermined set of reference locations, those locations are often referred to as "homes". A typical device may have one or more "homes". Generally, the identification of homes needs to be done individually for each device to be bonded. It is common practice to use a three-step process to enable such identification.

In the step of "teaching", the coordinate locations of the homes and all the needed bonds are identified and saved to create the "device program". Once generated, a device program can be stored, copied and/or shared between multiple machines as needed.

In the step of "regeneration", a human operator helps in locating the homes of the first device after loading in the information from the previously saved device program. At this point, the machine captures and saves a set of images, called "reference images" or "references" in the neighborhood of each home.

In the step of "bonding", the machine indexes one unit or more at a time into the workstation under the bond head. At this point, the vision system, with the aid of a pattern recognition system, attempts to relocate the matching locations with the saved references. After finding the new coordinates of the matching references, the home and bond locations are re-computed for that specific unit from the device program data. The process of relocating the references and homes is normally referred to as "aligning" the device. Using the specific bond locations, the device can now be bonded. The process of indexing, aligning and bonding is repeated without any human intervention as long as nothing abnormal happens on the machine.

A typical alignment procedure may correct for a constant shift in x-y directions and/or a constant rotation of the device. In this context, it is important to understand the effects of variations in illumination settings across machines and the images formed using different levels of brightness. Large differences in intensity settings can reduce the ability of the pattern recognition system to locate the references accurately. It is very much desired to have a consistent level of brightness and image quality across all the machines used.

Problems in wire bonding techniques arise in part from the technology trends to increase the number of leads in a given package and to make IC chip packages smaller. As consequences, the bonding pads located on the chip receive smaller areas and are spaced closer together, and the inner leads of leadframes are made narrower and closer together. These trends demand tighter control of wire bond ball and stitch geometries and placements. For instance, even small bond placement errors may result in device loss.

For the bond machines, errors in x-y tables and motors need to be reduced. At the microscopic level, each axis of each table behaves differently with its own local variations within their usable regime. For instance, an axis might have a 0.5% error in its first half of working distance and a 0.8% error in its second half. Further, a x-y pair might have a global positioning error because of an error in the orthogonality between them; or the tables may exhibit a range of hysteresis errors. These variations become even more threatening as common device programs are shared due to quality enforcement and economic reasons.

The emerging technical problems for automated bond machines can be summarized as follows:

Accuracy: Small ball/fine pitch bonding requires a very accurate system to be able to place the ball completely on the bond pad. The current systems have difficulties in achieving this.

Large variations in illumination settings can lead to variations of the images as seen by the optics and the camera. These variations may affect the ability of the pattern recognition system in locating the homes and bond locations accurately.

The current systems cannot handle x-y table inconsistencies. For small pad/fine pitch bonding, a small error in ball placement can cause the ball to be partially off the pad.

Human error during regeneration of alignment program: Ball placement is greatly affected by the accuracy of the alignment program. There are many steps to this regeneration process and thus there are many chances for human error.

Time spent performing alignment regeneration: Whenever a device is to be bonded, a human operator typically has to spend a finite amount of time to perform an alignment regeneration.

An urgent need has therefore arisen for a fast, reliable and flexible system and method to reduce set-up time, reduce errors during creation and retrieval of bonding programs, compensate for machine variability, and standardize illumination conditions on bonding machines. The system and method should be flexible enough to be applied for different IC product families with a wide spectrum of design variations, and for different bond machines. The system and method should spearhead solutions toward the goals of improved product yield and reliability, preferably without investment in new equipment.

SUMMARY OF THE INVENTION

The present invention provides a computerized system and method for customizing bond programs in order to compensate first for variabilities in an integrated circuit (IC) "slave" bonder, and second to any irregularities in a "slave" circuit positioned on the slave bonder for attaching connecting bonds onto the IC bond pads. According to the invention, a "master" segmentator groups the bond pads of a "master" circuit on a master bonder into segments and stores the reference data related to these segments in a master file. Next, a slave regenerator, coupled to the master file, regenerates the master reference data so that variable characteristics of the slave bonder are defined and adaptively compensated. Finally, a slave corrector, coupled to the salve regenerator, corrects the bond program for the slave circuit on the adaptively compensated slave bonder. The slave bonder attaches the connecting bonds based on the computed correct bond locations.

The present invention is related to high density ICs, especially those having high numbers of input/outputs and tight constraints in package outline and profile. These ICs can be found in many semiconductor device families such as processors, standard linear and logic products, digital and analog devices, high frequency and high power devices, and both large and small area chip categories. Since the invention aims at designing devices with minimum geometries and high reliability, it supports continually shrinking applications such as cellular communications, pagers, hard disk drives, laptop computers and medical instrumentation.

It is an object of the present invention to provide an automated system and method for compensating for apparatus-dependent variability of the slave bonder, as well as for adapting to time-dependent variability of the bonder. The object is achieved by an embodiment of the invention using a computer system and computer-implemented method of comparing certain groupings ("segments") of bond pads, and identifying and correcting any shifts, rotations, or scalings.

Another object of the invention is to provide an automated system and method for retrieving master information and comparing it with the actual bond pad locations on the circuit-to-be-bonded, followed by automated corrections, while entering the master input data manually by an expert. Constructing the network of relationships between the entered data is also computerized. The object is achieved by an embodiment of the invention using a computer system and a computer-implemented method for automatically collecting, analyzing and storing the needed information.

Another object of the present invention is to provide a highly flexible system and method. This object is achieved by the embodiments of three subsystems of the invention:

A master segmentator providing a user-friendly manual input data generator operable to select bond pad segments, alignment reference points, reference images, and bond pad points from a master circuit belonging to the same device family as the circuit-to-be-bonded ("slave circuit").

Further, a computerized analysis generator operable to establish geometric relationships, expressed in x-y and polar coordinates, between the master circuit bond pad locations, bond pad segments, and reference structures, and to store all data and relationships in a master file.

A computerized slave re-generator operable to download these data and relationships to a slave bonder designated to perform the bonding processes on the slave circuit.

Further, an adaptive compensator having a segment comparator and a bond location corrector, operable to compare bond pad segments from the master file to segments generated from a first selected slave circuit, to correct any shifts, rotations or scalings between these two segments, and to correct computationally bond pad locations.

A computerized slave corrector operable to identify and correct shifts, rotations or scalings of a slave circuit-to-be-bonded, which is selected consecutively after the first slave circuit. After bond program corrections, the slave bonder is ready to perform the bonding processes on the re-computed pads of the slave circuit.

Another object of the present invention is to provide the newly computed bond locations in fast turnaround time and with minimum effort by taking full advantage of symmetries and branching in the computational flows of the input and analysis generators, the segmentator, the retriever, and the corrector.

Another object of the present invention is to introduce bond program teaching, loading ("regeneration") and correcting concepts which are flexible so that they can be applied to many families of electronic structures—reaching from piece parts, such as leadframes and interconnectors, to device packages, to electronic substrates, and to whole assemblies on motherboards—and are general so that they can be applied to several generations of products.

Beyond the electronics realm, the computerized system and method of this invention can be generally applied to reduce operational program errors on slave machines prepared to work on action sites of slave objects, when a master machine and a master object, having a structure similar to the slave object, are available.

The technical advances represented by the invention, as well as the objects thereof, will become apparent from the following description of the preferred embodiments of the invention, when considered in conjunction with the accompanying drawings and the novel features set forth in the appended claims.

BRIEF DESCRIPTION OF THE DRAWINGS

FIG. 4 illustrates a block diagram of the detail of the input data generator associated with the computerized master bonder.

FIG. 5 illustrates a block diagram of the detail of the analysis generator and the master file associated with the computerized master bonder.

FIG. 9 illustrated a block diagram of the detail of the slave corrector associated with the usage/bonding of the computerized slave bonder and slave circuit.

DETAILED DESCRIPTION OF THE PREFERRED EMBODIMENTS

Figure 1:
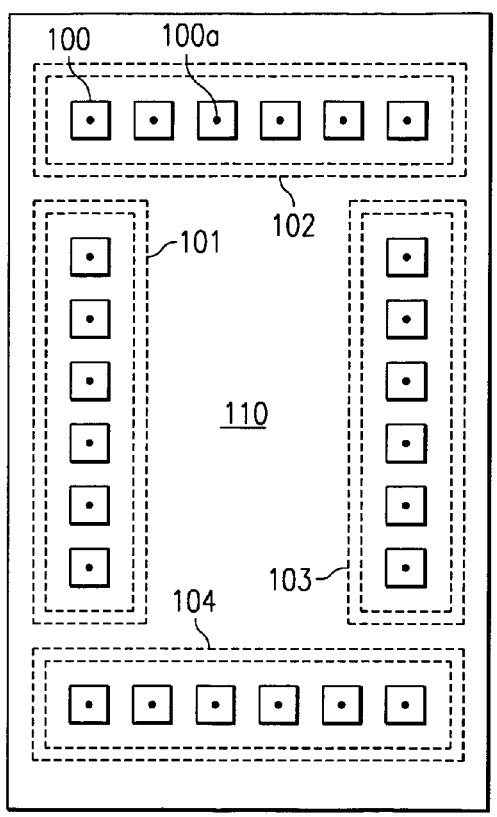
FIG. 1 is a schematic and simplified top view of an integrated circuit (IC) chip illustrating bond pads with correctly placed bond attachments, and groupings of bond pads into segments.
Figure 2:
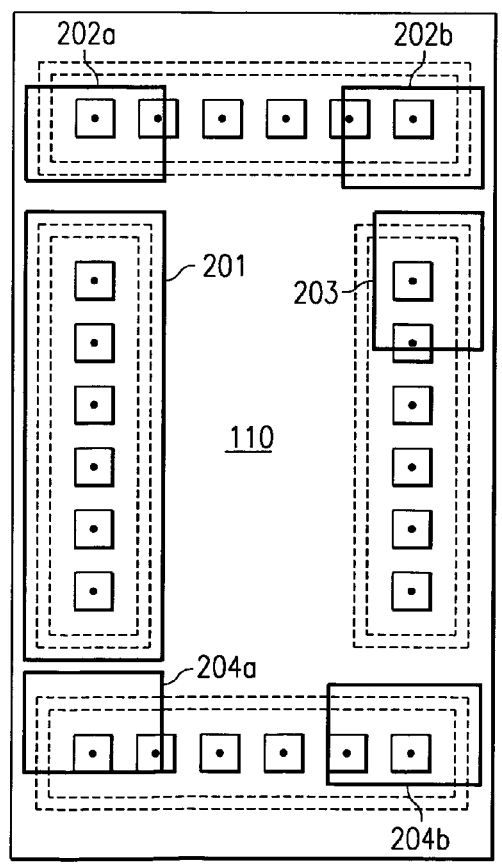
FIG. 2 is a schematic and simplified top view of an IC chip illustrating bond pads with erroneously placed bond segments.

In order to eliminate variability of the automated bonding machines ("bonders"), which may depend on the specific apparatus or may be time-dependent, the invention uses the approach to group a small set of bond pad locations into "segments" during the device program "teaching". As examples, FIGS. 1 and 2 illustrate the approach and the solution to problems in assembling semiconductor chip 110 caused by machine-related errors in bonding operation. As illustrated in FIG. 1, a plurality of bond pads 100 lined up along one of the x or y axes may be grouped as a segment. All or some of the bond pads may be grouped into different segments, such as the four segments 101, 102, 103, and 104 in FIG. 1, each containing six bond pads. Within the small stretch covered by the segment, it may be assumed that the bonding tables behave linearly (polynomially). (In the ideal assembly case illustrated, all bonds 100a attached to pads 100 are located in the center of the pad areas.)

Each segment may further have one or more references associated with it. These references may contain the image of the entire segment or a part of its neighborhood. FIG. 2 shows an example of segment references for the segments illustrated in FIG. 1. Associated with segment 101 is reference 201, containing all of the bond pads. Associated with segment 102 are the references 202a and 202b. Associated with segment 103 is reference 203. Associated with segment 104 are references 204a and 204b. During device program "teach", the data relating to the position and contents of the segments and segment references is also saved into the device program along with the other information that is usually considered as a part of the device program information.

The number, location, size and shape of the segments and segment references may be selected manually by the expert creating the device program, or may be selected automatically by the image processing system. In either case, rules are enforced that would enable easy identification of uniquely matching position at a later time.

With all this data, a segment may contain the information about the bonds included in that segment and the references associated with the segment according to the conditions of the program generation. When such a device is copied to a different bonding machine with different x-y table characteristics, the coordinates of various points in the device program need to be "customized" for the new conditions. This may be achieved with the aid of the vision system to locate the new positions of the individual segment references.

By studying the positional relationship between the segment references during the teach (as saved in the device program) and the way they are newly located, the positioning system variations can be modeled as a mathematical relationship. Depending on the number of references selected, the model may provide the information to correct for variations in translation (shifts), rotation, scale (expansion), skewness, and others. In this correction, parameters can be applied locally to only those coordinates of the bonds belonging to that segment.

Repeating the process on all the segments of the device will re-map all the useful travel locations of the positioning system by matching it at all local positions with that of the bonding machine ("master bonder") on which the device program was originally created.

This procedure will assume the master bonder to have the fundamental conditions which all others will emulate to create uniformity among the bonders that are inherently different.

Once a device program is customized for an individual machine ("slave bonder"), a temporary copy of the variation-adjusted device program is created and used to bond a plurality of devices. When a different batch of devices is required to be bonded on the same bonder, a corresponding device program is brought in and the process is repeated.

The system and method disclosed by the present invention for adaptively compensating the slave bonder and subsequently correcting the bond program of the device-to-be-bonded are described in FIGS. 3 to 10.

Figure 3:
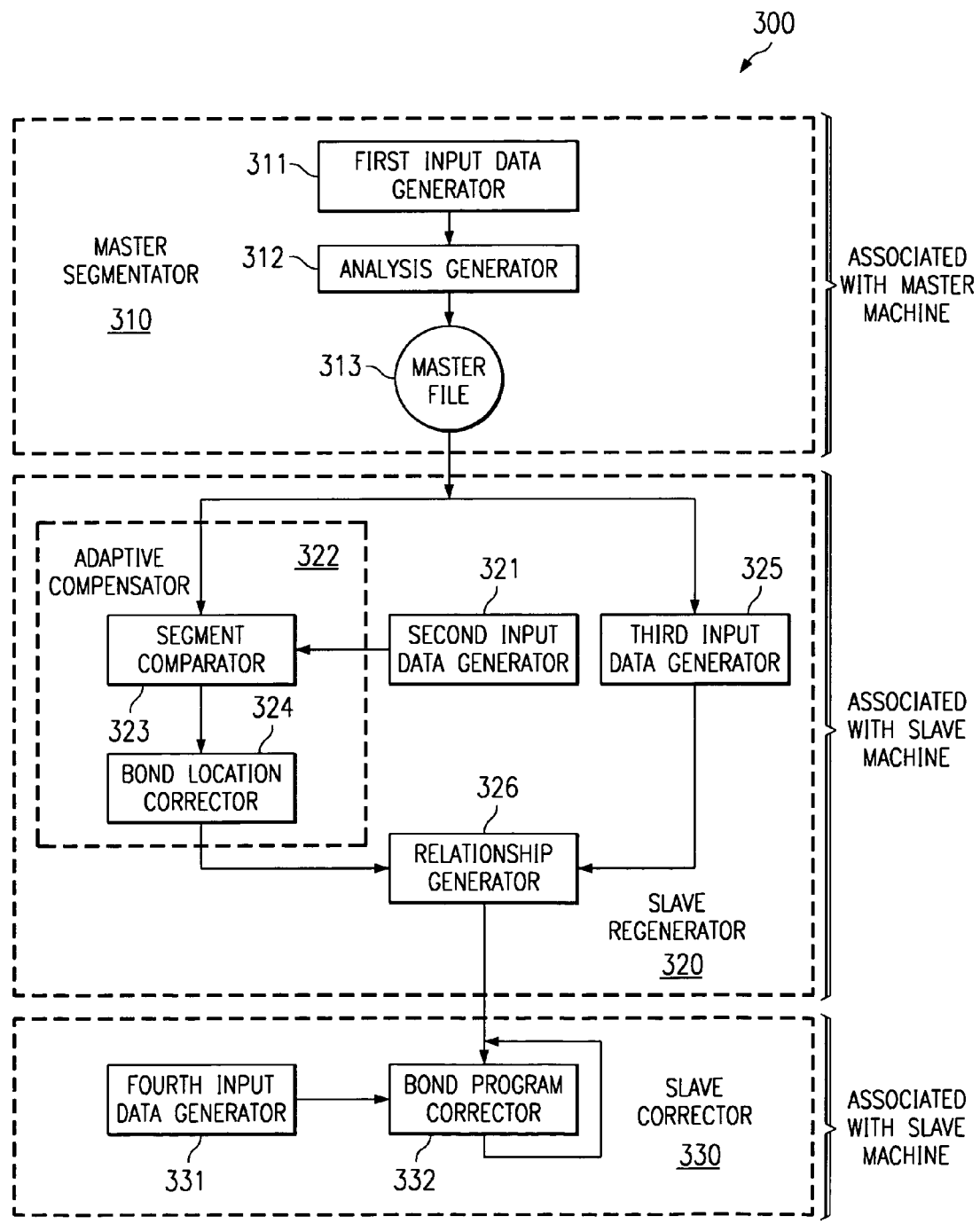
FIG. 3 illustrates a block diagram of a computer system for customizing bond programs and compensating integrated circuit bonder variability according to the invention.

In order to highlight the conceptual breadth of the present invention, as summarized in the block diagram of FIG. 3, it should be pointed out that the contributing innovations come from three regimes of the assembly and bonding process:

Establishing the Master Bond Program ("Teaching"): "Master Segmentator"
  Defining bond locations (x-y parameters).
  Defining a set of bond segments (a series of bond points.
  Defining a set of segment images related to each bond segment.
  Relating the bond locations, the bond segments, and segment images in a network of relationships.
  Saving data and relationships in a master bond program (master file).
Regenerating (Loading) Master Bond Program: "Slave Regenerator", Machine-Specific Corrections
  Retrieving the saved master program onto any other selected machine ("slave bonder").
  Using the segment images to relocate all the individual bond segments and the bond locations in all the segments.
  Comparing the new bond locations with the taught ones and correcting for any local and global variations in the slave machine's moving parts.
Bonding the Slave Circuit using Unit-Specific Corrections: "Slave Corrector"
  Bonding using the newly computed bond locations.

The above list shows that the invention uses automation in order to solve the problem of variable machine characteristics (variable from bonder to bonder and within time), for which in standard technology a human operator has to get involved. In principle, the innovation is based on relationships expressed between geometrical x-y locations and images of bond pads, bond pad segments and references.

The description of the invention based on FIG. 3 and the more detailed FIGS. 4 to 10 illustrates that the invention is not restricted to ICs, bonders and bonding technology. It can be generalized to similar tasks involving machines with variable characteristics, or in which a process is to be performed on objects with imperfections or deviations relative to a master object.

As illustrated schematically in the simplified block diagram of FIG. 3, the computerized system of the present invention, generally designated 300, operates to customize the bond program for a slave circuit on a slave bonder. The system provides a master segmentator 310 operable to group the bond pads of a master circuit on a master bonder into segments and store the reference data related to the segments in a master file 313 (master bond program). The system further provides a slave regenerator 320, coupled to the master file 313, operable to regenerate the master reference data so that variable characteristics of the slave bonder are defined and adaptively compensated. The system finally prides a slave corrector, coupled to the slave regenerator, operable to correct the bond program for the slave circuit on the adaptively compensated slave bonder.

The master segmentator 310 provides data generation as well as data analysis for creating corrected bonding instructions for the bonding process of an IC. A first data input generator 311 is associated with a master IC on a master bonding machine and collects data manually by a human expert. Included in these data are geometrical information such as x-y locations of bond pads, x-y locations of bond segments, and images of these segments and geometrical information of these images. All data is collected from a master IC which is related in geometry to the circuit-to-be-bonded, usually an IC of the same device type.

Input data generator 311 is connected to an analysis generator 312, also associated with the master bonder and operated manually by a human expert. The analysis generator establishes relationships for the master bonder between the geometrical information of the bond pads, the bond segments and the segment images. It further constructs a network of these relationships. The analysis generator 312 then stores the network of relationships together with the geometrical information of the bond pads, bond segments and images in the master file 313. These stored data is referred to as the master bond program. It is coupled to the master bonder, but also to any selected bonder working as slave bonder.

Associated with the slave regenerator 320 on the slave bonder is the second input data generator 321 which collects images from the plurality of bond segments on the circuit-to-be-bonded. The bond segments define the variable characteristics of the slave bonder. The images are made available in conjunction with the data retrieved by segment comparator 323 within the adaptive compensator 322.

Associated with the slave bonder is the adaptive compensator 322, operated by computer or, alternatively, manually by the user of the slave bonder. The first part of the adaptive compensator 322 is the segment comparator 323, which is coupled to master file 313 and the second input data generator 321. It has the job of retrieving the bond segment images from the master bond program 313 as well as from the second input data generator 321. Based on this comparison, the variable slave bonder characteristics are quantified and the bond segments are relocated.

Further associated with the slave bonder and the adaptive compensator 322 is the bond location corrector 324, which is coupled both to the segment comparator 323. Bond location corrector 324 retrieves the relocated bond segments and re-computes the bond locations in each of the segments.

The third input generator 325, associated with the slave bonder and coupled to the master file 313, generates images of the alignment references on the slave circuit selected as the first one to be bonded by the slave bonder.

The relationship generator 326, associated with the slave bonder and coupled to the bond location corrector 324 and the third input data generator 325, constructs relationships for the slave bonder between the re-computed bond locations, the alignment reference images and the reference image locations. These relationships comprise equations in x-y coordinates and polar coordinates.

Further associated with the slave bonder is the slave corrector 330. It includes the fourth input data generator 331 which generates images of alignment references on the slave circuit selected next (consecutive to the previous one) to be bonded by the slave bonder. These images are forwarded to the bond program corrector 332.

The bond program corrector 332 within the slave corrector 330 is associated with the slave bonder and coupled to the relationship generator 326 and the fourth input data generator 331. The bond program corrector 332 compares the alignment reference images from the third input data generator 325 and the fourth input data generator 331 and combines the results with the relationships from relationship generator 326. Based on this comparison, the bond pad x-y locations are recomputed and the bond program of the slave bonder is corrected. Directed by the recomputed bond program, the computerized slave bonder is enabled to attach the connecting bonds to the correct bond pad locations of the consecutively selected slave circuit, free of errors and manual operator interference.

The computerized system 300 is generally capable of adaptively compensating slave machine variable characteristics and eliminating errors of an operational program in a slave machine which is prepared to work on action sites of a slave object. Examples are characteristics and programs of machines which function to deposit materials onto object surfaces (for instance, by printing, inking or jetting), or which are to perform operations in a patterned arrangement (for instance, drilling of holes). The principals of this invention apply to these examples.

FIG. 4 shows the input data generator 311 in more detail. The first organizer 401 operates to select bond pad points and to collect the x-y locations correlated to these points. This "teaching" of bond pad points can be performed manually. The organizer then stores these x-y locations data in file 402. Consequently, file 402 serves to save the bond pad x-y locations.

File 402, and thus the first organizer 401, is coupled to segmentator 403. This segmentator operates to group the bond pads into segments and to determine which bond points belong to which of these segments. The segments data are stored in the bond pad segments file 404. This segmentation can be performed manually.

File 404, and thus segmentator 403, is coupled to the second organizer 405. This second organizer 405 operates to select x-y locations and geometrical information identifying segment images, and to store the image x-y locations data in file 406. Consequently, file 406 serves to save segment image x-y locations. This "teaching" of the segment images can be performed manually.

File 406, and thus the second organizer 405, is coupled to collector 407. This collector 407 operates to collect images of the segments and to store these images in segment image file 408. This image collection can be performed manually. Segment image file 408 is coupled to analysis generator 312.

FIG. 5 shows the function of the analysis generator 312 in more detail. The analysis generator 312 is a computerized relations builder. In its operation it first selects segments, images identifying these segments, and x-y locations of the bond pads and the images. The analysis generator then expresses their mutual relationships in equations expressed in x-y coordinates and polar coordinates. As a result, an interconnected network of relationships between bond locations, segments, segment identifying images, and segment identifying image locations is established.

This interconnected network is stored in master file 313. Further, master file contains all the geometrical data and the images of the bond pads and segments as well as the relationships.

Figure 6:
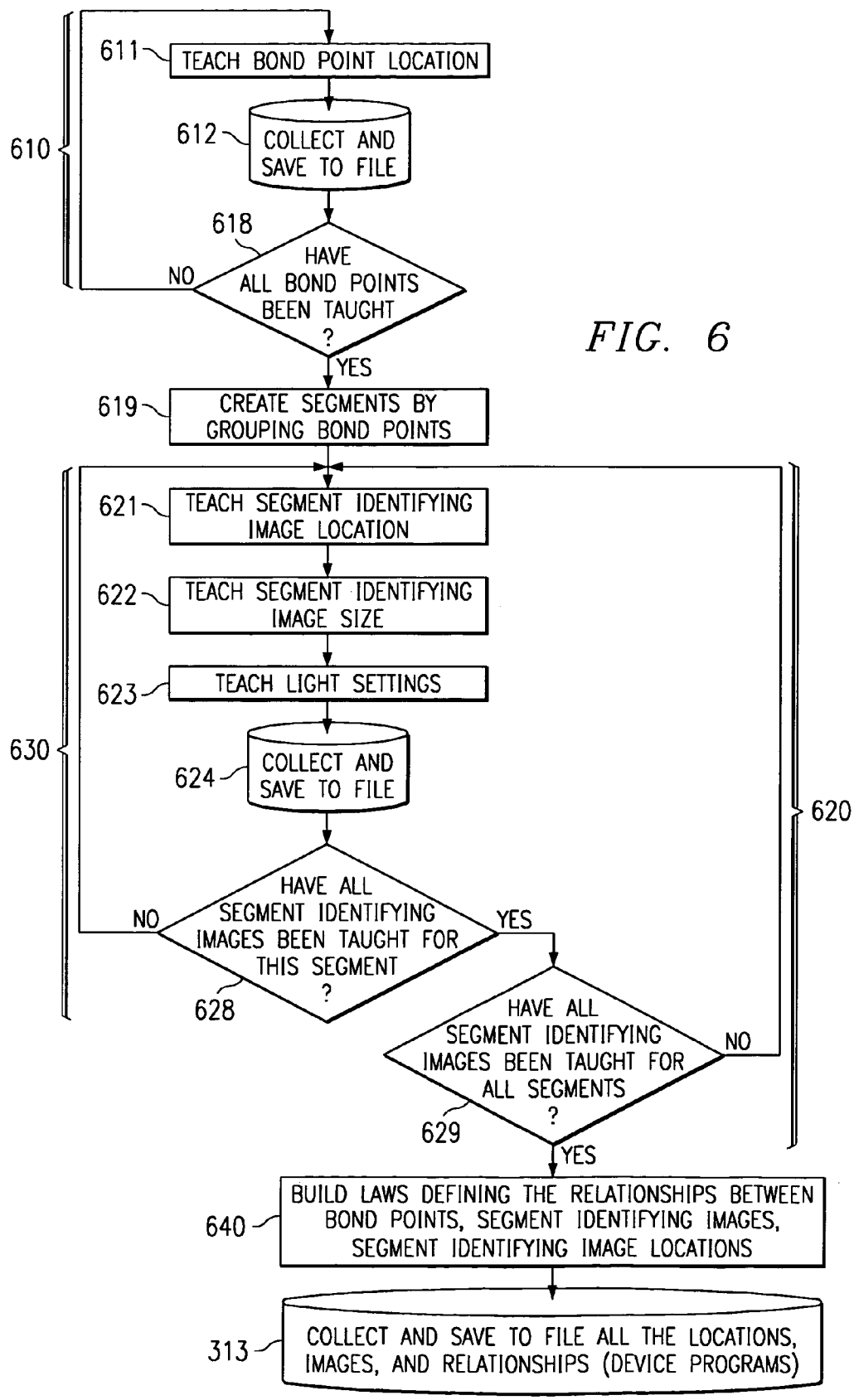
FIG. 6 is a flow chart of the method used to generate inputs and analysis according to the invention.

The computerized method of generating input data and performing and storing the analysis of the data according to the invention is described by the process flow of FIG. 6. The software loop 610 provides the bond points input data, the software loop 620 provides the segment identifying images input data for one segment, and the software loop 630 provides the segment identifying images input data for all segments. Loop 610 begins with the input step:

611: Teaching bond point location.

The data collected from this input source are stored in file 612. After each acquisition loop, the question is asked in gate 618, whether all bond points have been taught. As long as the answer is "no", another loop of data acquisition has to be performed. When the answer is "yes", the input process advances to creating segments by grouping bond points (619). The segments proceed to the loop 620.

Segments loop 620 begins with the input step:
621: Teaching segment-identifying image location.
622: Teaching segment-identifying image size.
623: Teaching light setting.

The data collected from these three input sources are stored in file 624. After each acquisition loop, the question is asked in gate 628, whether all segment-identifying images have been taught for this segment. As long as the answer is "no", another loop of data acquisition has to be performed. When the answer is "yes", the input process advances to gate 629 which asks the question whether all segment-identifying images have been taught for all segments. As long as the answer is "no", another loop 620 of data acquisition has to be performed. When the answer is "yes", the input process advances to the analysis generator 640.

The data stored in file 612 together with the data stored in file 624 are used by the analysis generator 640 to construct the mathematical equations expressing the relationships between the bond pad points, the segment-identifying images and the segment-identifying image locations of the master circuit as described above. The resulting network of relations, together with all the locations data and images, is stored in master file 313 as the master bond program ("device program").

Figure 7:
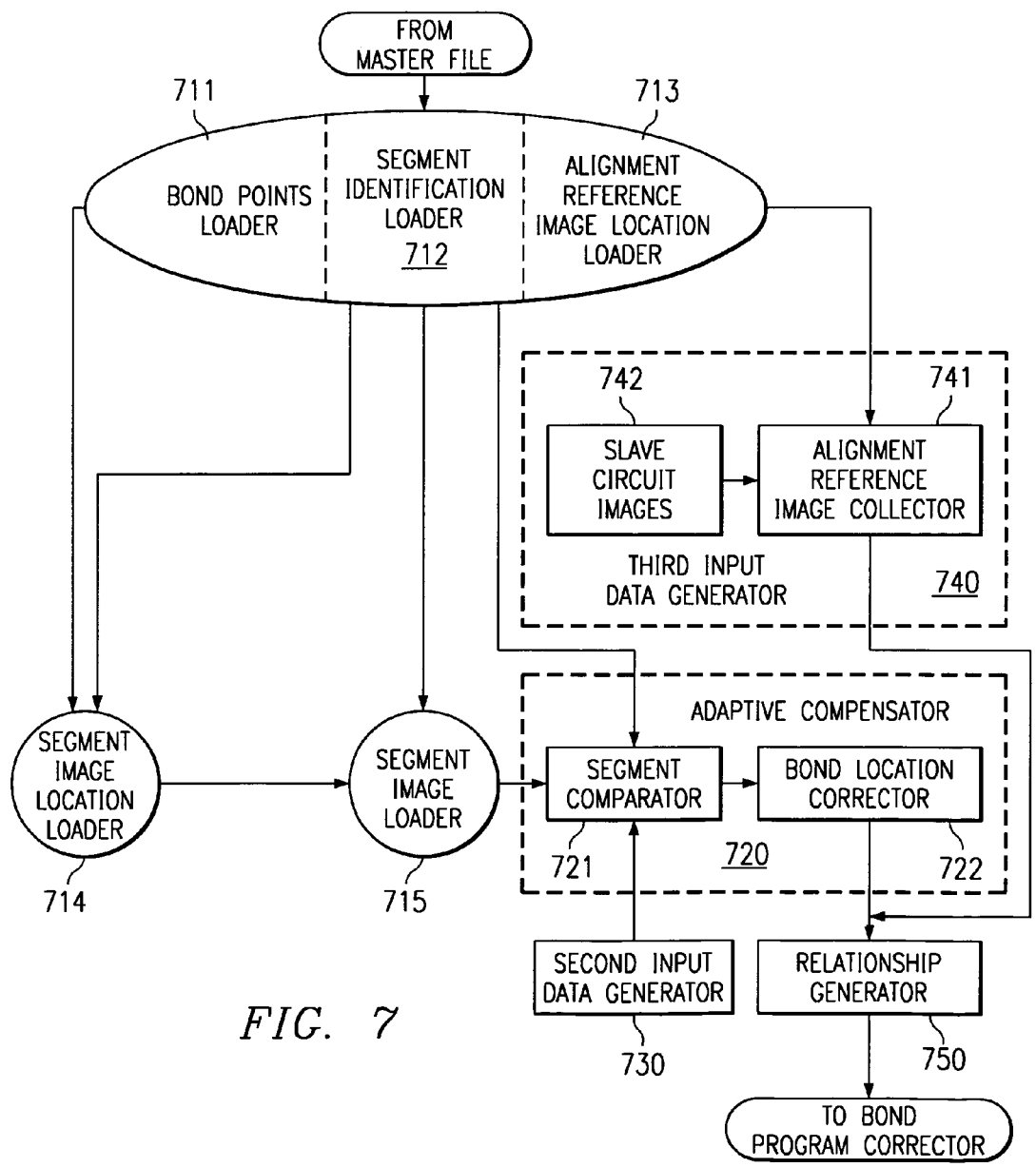
FIG. 7 illustrates a block diagram of the detail of the slave regenerator for retrieval, capture and rebuild associated with the computerized slave bonder and slave circuit.

FIG. 7 shows the slave regenerator 320 (see FIG. 3), associated with the slave bonder, in more detail. Three sets of data are downloaded from the master file:
Bond points loader 711;
segment identification loader 712;
alignment reference image location loader.

The bond points loader 711 operates to download stored master bond points x-y locations data. The segment identification loader 712 operates to download stored master segment x-y locations data. These two data sets are combined in the segment image locations loader 714 which identifies segment image x-y locations data. These data are then forwarded to the segment image loader 715 where they are combined with the segment identification loader 712 in order to identify segment images (from the master circuit). The data is then forwarded to the adaptive compensator 720, specifically to the segment comparator 721, which quantifies the variable characteristics of the slave bonder.

Segment comparator 721 retrieves the bond segment images from segment image loader 715 and segment identification loader 712. It compares the images of the master circuit with the images of bond segments collected by the second input data generator 730 from the particular slave circuit which has been selected first to undergo the bond attachment steps. As a result of this comparison, the variable bonder characteristics can be quantified, and the bond segments can be relocated. Based on this comparison, the bond location corrector 722, which retrieves the relocated bond segments 721, can now re-compute the bond locations in each segment. Consequently, the individual characteristics of the slave bonder are adaptively compensated, both the apparatus-specific irregularities and any time-variable features.

The alignment reference image location data 713 from the master circuit are input into the alignment reference image collector 741 and combined with slave circuit images provided by image generator 742. Collector 741 thus generates images of the alignment references on the slave circuit and creates input data (as third input data generator 740) to be combined with the corrected bond locations data 722 and forwarded to the relationship generator 750.

Relationship generator 750 operates to construct relationships for the slave bonder between the re-computed bond locations, the alignment reference images and the reference image locations. These relationships are forwarded to the bond program corrector.

Figure 8:
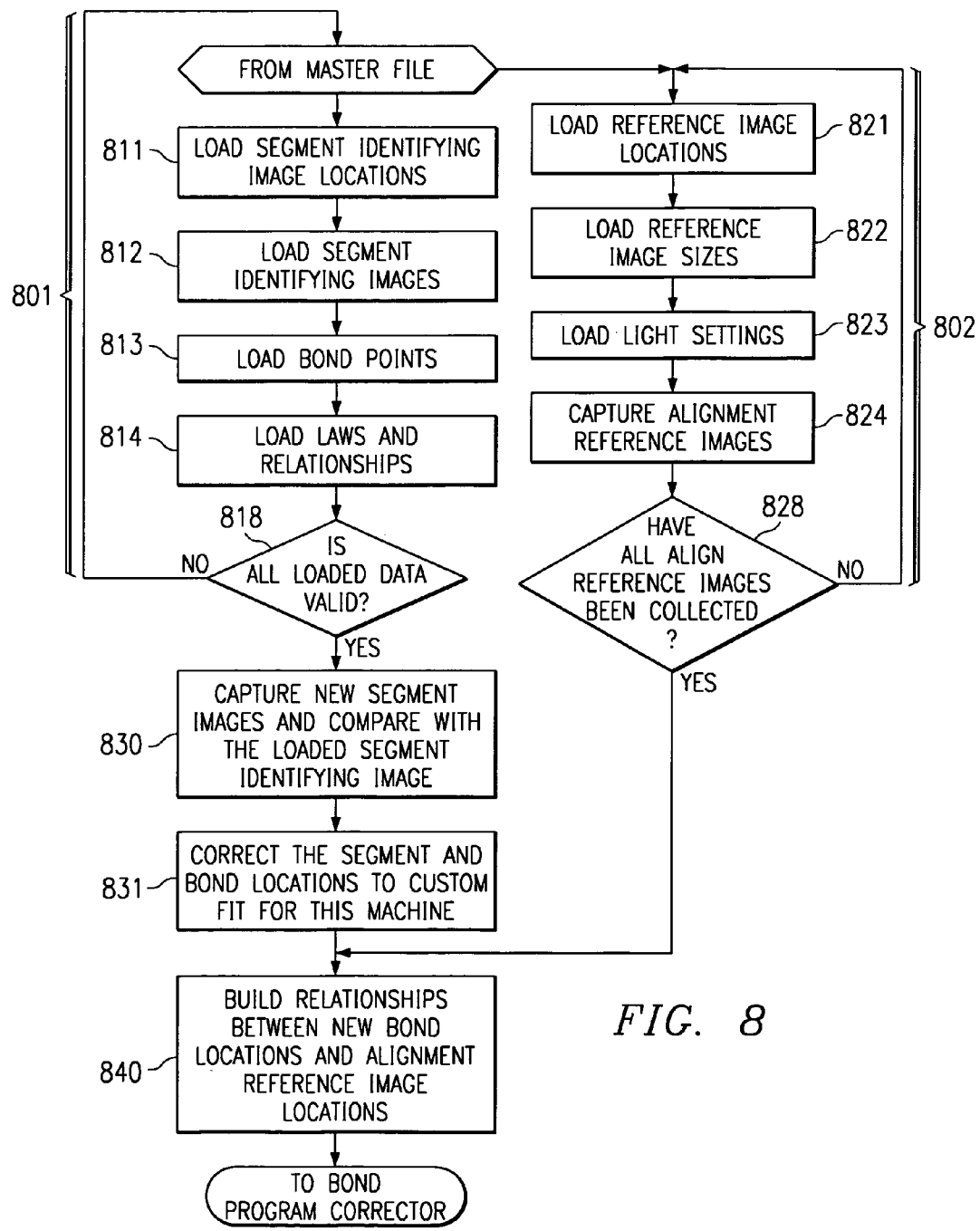
FIG. 8 is a flow chart of the method used by the slave regenerator according to the invention.

The computerized method of adaptively compensating the slave bonder characteristics according to the invention is described by the process flow of FIG. 8. The software loop 801 provides the inputs for the adaptive compensator. The software loop 802 provides the inputs of the third input data generator. Both loops begin by selecting a device program from the master file. Loop 801 consists of the steps of:

811: Downloading segment-identifying image locations.
    812: Downloading segment-identifying images.
    813: Downloading bond x-y points.
    814: Downloading relationships between bond points, segment-identifying images and segment-identifying image locations.

After each downloading loop, the question is asked in gate 818, whether all downloaded data is valid. As long as the answer is "no", another loop of data downloading has to be performed. When the answer is "yes", the data advances to the comparison step 830 in the segment comparator.

In process step 830, the loaded segment-identifying image is compared with segment images newly captured from the slave circuit, which has been selected first to undergo the bond-attaching steps. Based on this comparison, process step 831 is correcting the segment and bond locations so that they custom-fit the slave bonder used. The individual slave bonder characteristics are thus adaptively compensated.

Loop 802 consists of the steps of:
    821: Downloading reference image locations.
    822: Downloading reference image sizes.
    823: Downloading light settings.
    824: Capturing/generating alignment reference images.

After each downloading and capturing loop, the question is asked in gate 828, whether all align reference images have been collected. As long as the answer is "no", another loop of data downloading and generating has to be performed. When the answer is "yes", the slave regeneration process advances to the step 840 of generating relationships.

In process step 840, the re-computed bond locations from step 831, the alignment reference images and the alignment reference image locations from step 828 are combined to construct relationships between them in the form of mathematical equations. The relationships advance to the bond program corrector.

FIG. 9 illustrates detail of the slave corrector, associated with the slave bonder. As shown in FIG. 9, data retrieved from the alignment reference image collector 741 (in the third input data generator) are combined in the alignment reference comparator 903 with new images of alignment references supplied by the fourth input data generator 901. These new images are collected from the next slave-circuit-to-be bonded, selected consecutively from the plurality of slave circuits. The alignment reference comparator 903 operates to compare the alignment reference images from the consecutively selected slave circuit with the alignment reference images from the first selected slave circuit and to quantify any shifts, rotations or scalings between the two images or image parts.

Any deviations found by the comparator 903 are corrected in re-computor 904. The results are then combined with the recreated bon x-y locations data from the bond location corrector 722 (in the adaptive compensator) and the rebuilt relationships between the bond locations and the alignment reference image locations, as obtained by the relationship generator. Based on these data, the re-computor 904 is then correcting the bond pad locations of the consecutively selected slave circuit and thus correcting the bond program of the slave bonder for attaching bonds onto the bond pads of the consecutively selected slave circuit. Alignment reference comparator 903 and re-computor 904 form the bond program corrector 902.

The corrected coordinates (x-y locations) of the slave circuit bond pads can now be forwarded to the bonding machine (bonder) 910. The computerized bonder 910, coupled to the bond program corrector 902, operates as the slave bonder to attach the connecting bonds (wires, ribbons, balls, stitches, etc.) to the bond pads of the slave circuit-to-be-bonded under the direction of the re-computed bond pad locations (bond program) provided by the re-computor 904.

Figure 10:
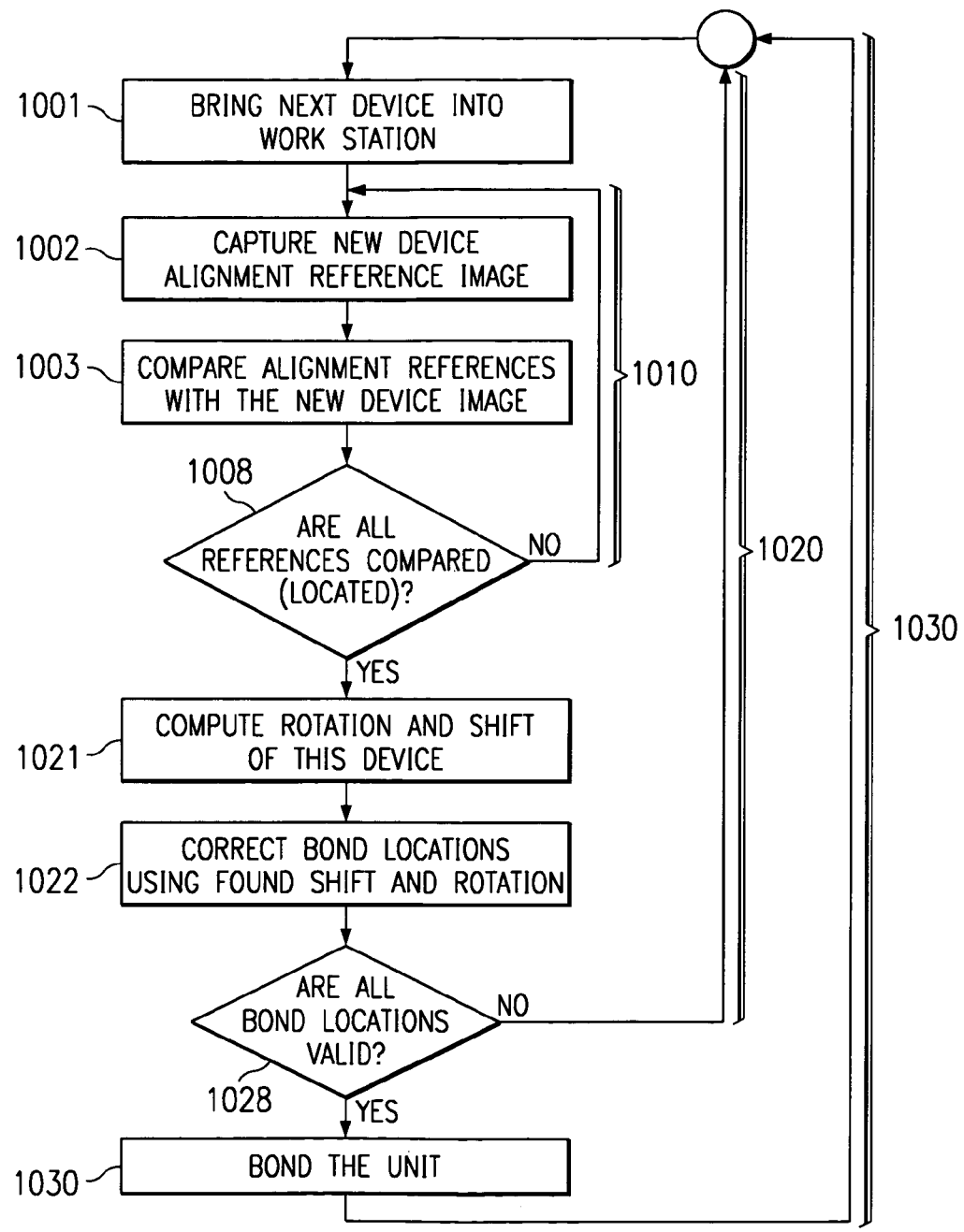
FIG. 10 is a flow chart of the method used by the slave corrector and the slave bond head according to the invention.

The computerized method of computing, correcting, and using bond pad data by the slave corrector according to the invention is described by the process flow of FIG. 10. The process starts with the step of:

1001: Bringing the next circuit-to-be-bonded ("new" slave circuit) into the bonder work station (slave bonder).
    1002: Capturing alignment reference images on the new slave circuit.
    1003: Comparing alignment references of third input data generator (740 of FIG. 7) with the new device alignment reference image.
    1008: After each identification of a reference, the question is asked in gate 1008, whether all references have been compared/located. As long as the answer is "no", another loop 1010 of comparing/locating references has to be performed. When the answer is "yes", the process flow advances to step 1021:
    1021: Computing any shifts, rotations, or scalings found on this slave circuit, as described in FIG. 9.
    1022: Re-computing the correct bond pad locations on the slave circuit. After each re-computing, the question is asked in gate 1028, whether all slave circuit bond pad locations are valid. As long as the answer is "no", another loop 1020 of re-computing and correcting has to be performed. When the answer is "yes", the actual bonding process 1031 on the slave circuit can begin.

In loop 1030 finally, another circuit is readied for the bonding process and subjected to the process flow as described above.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments. As an example, the computer-implemented method of the invention can be applied for reducing operational program errors in any slave machine, prepared to work on action sites of any slave object, and comprises the steps of:

generating input data associated with a master machine, said data collected from a master object, related in geometry or history to said slave object, and comprising geometrical information of action sites and action segments, images of said segments, and geometrical information of said images;

generating an analysis for constructing relationships for said master machine between said action site locations, action segments, and segment image locations;

storing said relationships, said geometrical information and said images in a master file as an operational master program;

generating input data associated with said slave machine, said data collected from said slave object and comprising images of a plurality of action segments, defining the variable characteristics of said slave machine;

retrieving said action segment images from said master operational program as well as from said slave machine, comparing and quantifying said variable machine characteristics, and relocating said action segments;

retrieving said relocated action segments and re-computing said action locations in each of said segments;

generating input information comprising images of alignment references collected from an object selected first from said slave objects;

constructing relationships for said slave machine between said re-computed action locations, said alignment reference images, and said reference image locations;

generating input information comprising images of alignment references collected from an object selected consecutively from said slave objects;

comparing said alignment reference images from said first selected slave object with said alignment reference images from said consecutively selected slave object; and correcting any deviations found between said reference images, combining the result with said relationships, re-computing said action x-y locations, and correcting said operational program of said slave machine for working on said action sites of said consecutively selected slave object.

We claim:

1. A system comprising
    a first bonder for bonding semiconductor chips having a calculating unit for manipulating data relating to a bonding operation, a memory unit for storing information relating to the bonding operation, and an optical unit for acquiring visual images relating to the bonding operation,
    and a communication means for providing communication between the calculating unit, the memory unit, and the optical unit of a bonder, and for providing communication to a second bonder; the second bonder having a calculating unit for manipulating data relating to a bonding operation, a memory unit for storing information relating to the bonding operation, and an optical unit for acquiring visual images relating to the bonding operation, an adaptive compensator for generating a corrected device program for controlling the bonding operation, and a communication means for providing communication between the calculating unit, the memory unit, and the optical unit of a bonder, and for providing communication to the first bonder;
    a semiconductor chip having a plurality of bondpads arranged on the semiconductor chip;
    a set of segments of bondpads of the semiconductor chip, each segment having a reference member related to a number of bondpads in the segment and coordinates of the reference member and a visual representation of the segment;
    a device program including information related to the semiconductor chip and the segments, the reference members, the coordinates of the reference members, and the visual representations;
    the device program stored in the memory unit of the first bonder and a copy of the device program stored in the second bonder;
    corrective data generated in the calculating unit of the second bonder relating the device program related to the semiconductor chip and the segments, including the reference members, the coordinates of the reference members, and the visual representations;
    the adaptive compensator of the second bonder adaptive to compare information from the stored device program and the corrective data ; and
    a bond program corrector for generating a corrected device program relating to the semiconductor chip and the segments, including the reference members, the coordinates of the reference members, and the visual representations, suitable for aiding the second bonder for the bonding operation.

2. A method for bonding a semiconductor chips with a plurality of bonders; comprising
    providing a first bonder having a calculating unit for manipulating data relating to a bonding operation, a memory unit for storing information relating to the bonding operation, an optical unit for acquiring visual images relating to the bonding operation and a
    a communication means for providing communication between the calculating unit, the memory unit, and the optical unit of a bonder, and for providing communication to a second bonder; providing the second bonder having a calculating unit for manipulating data relating to a bonding operation, a memory unit for storing information relating to the bonding operation, and an optical unit for acquiring visual images relating to the bonding operation, an adaptive compensator for generating a corrected device program for controlling the bonding operation, and a communication means for providing communication between the calculating unit, the memory unit, and the optical unit of a bonder, and for providing communication to the first bonder;
    providing a semiconductor chip having a plurality of bondpads arranged on the semiconductor chip;
    grouping the plurality of bondpads of the semiconductor chip into a plurality of segments, each segment having a reference member related to the bondpads in the segment, coordinates of the reference member and a visual representation of the segment;
    generating a device program including information related to the displacement of the bondpads on the semiconductor chip and related to the segments that group the bondpads, the reference members, the coordinates of the reference members, and the visual representations;
    storing the device program in the memory units of the first bonder and a copy of the device program in the second bonder;
    placing a semiconductor chip of the device program on the second bonder having the device program;
    capturing visual images of the segments of the bondpads on the semiconductor chip including the reference members and their coordinates;

communicating the visual images to the calculating unit;

communicating the device program to the calculating unit;

generating corrective data in the calculating unit of the second bonder based on the device program and the visual images; the adaptive compensator comparing the stored device program and the corrective data generating a corrected device program in the bond program corrector relating to the semiconductor chip and the segments, including the reference member, new coordinates of the reference members, and the visual representations;

communicating the corrected device program to the control unit of the second bonder for controlling the bonding operation; and performing the bonding of the semiconductor chip based on the corrected device program.

* * * * *